United States Patent [19]

Dongell

[11] Patent Number: 5,588,990

[45] Date of Patent: Dec. 31, 1996

[54] POZZOLAN CEMENT COMPOSITIONS AND ADMIXTURES THEREFOR

[75] Inventor: Jonathan E. Dongell, Scottsdale, Ariz.

[73] Assignee: Universal Cement & Concrete Products, Inc., Glendale, Ariz.

[21] Appl. No.: 552,635

[22] Filed: Nov. 3, 1995

[51] Int. Cl.⁶ .................................................. C04B 22/06
[52] U.S. Cl. .......................... 106/716; 106/718; 106/811; 106/819
[58] Field of Search .................................... 106/716, 718, 106/811, 819

[56] References Cited

U.S. PATENT DOCUMENTS

| Re. 16,732 | 9/1927 | Wig | 106/718 |
| 2,336,723 | 12/1943 | Drummond | 106/718 |
| 5,302,200 | 4/1994 | Smetana et al. | 106/718 |
| 5,352,288 | 10/1994 | Mallow | 106/724 |

*Primary Examiner*—David Brunsman
*Attorney, Agent, or Firm*—Richard R. Mybeck; Paula L. Bentley; Peter B. Scull

[57] ABSTRACT

Blended cement compositions for mixture with aggregate and water to prepare cementitious products. Such blended cement compositions contain cement, calcined diatomaceous earth, calcined kaolin, and about 0.5% to about 4% (w/w) of potassium, with or without talc and/or bentonite or their functional equivalents. Admixtures for blending into cement to create such blended cements or their read-mix equivalents contain calcined kaolin, calcined diatomaceous earth, and potassium, with or without talc and/or bentonite or their functional equivalents.

30 Claims, No Drawings

POZZOLAN CEMENT COMPOSITIONS AND ADMIXTURES THEREFOR

The present invention relates generally to the field of cementitious products, and more particularly to improved pozzolan cement compositions and admixtures for making cementitious products which, when mixed in a conventional manner with water, sand and/or aggregate, produces cementitious products which are less permeable, have greater workability, are resistant to attack from chemicals and aggressive water, avoid subsequent leaching of calcium hydroxide, and exhibit significantly less heat of hydration than heretofore possible. The composition can be used as, but is not limited to: mortar, concrete, plaster, pre-cast, stucco, gunite, shotcrete, and grout. The cementitious product of the present invention may be used in, but is not limited to, the construction of buildings, dams, bridges, roadways, slabs, pre-fabricated units, and pools. It may also be used to reinforce rebar, steel mesh, fiberglass, and like structural members.

BACKGROUND OF THE INVENTION

The making and using of pozzolanic cementitious products is an old art practiced by the Egyptians as well as the Romans. Pozzolanic cementitious products were widely used until the early 1940's when it became evident that the pozzolans had a slower strength gain and lacked workability in comparison to cement without pozzolans.

Cement continued to be ground finer and this along with the refining of the calcining process allowed for extremely workable pozzolan-free cements with good strength. Unfortunately, these beneficial increases were accompanied by an increase in calcium hydroxide which is the weakest constituent of a cement. An increase in calcium hydroxide meant an increase in aggressive attack of the cement. In the 1960's, the industry renewed its interest in pozzolanic cements.

Pozzolans are generally high in siliceous or in siliceous and aluminous materials. The chemical and physical mechanisms by which pozzolans react with cement to affect the properties of the resulting cementitious products are not fully understood although it is known that pozzolans usually have no cementing properties of their own. It is believed that the benefit pozzolans brought to cementitious products resulted from their ability to combine with free lime or calcium hydroxide in cement to create an insoluble compound having cementing properties.

Thus, an important benefit that pozzolans offered to cementitious products was their ability to react with calcium hydroxide thereby rendering the cementitious product more durable than otherwise possible. However, some pozzolanic constituents reacted slower than others and while they improved the resistance of the cementitious product to aggressive water attack, the improvement did not come soon enough for some applications, especially those cementitious products which were to be used in water contact situations, such as but not limited to bridge and pool construction. Other pozzolanic constituents reacted faster, but the cementitious products made with these pozzolanic constituents were generally not very durable. What was needed was a pozzolanic mixture which exhibited both a fast reaction, and resulted in workable, durable cementitious products.

Pozzolans include a wide variety of materials, naturally occurring and artificial. Each pozzolanic material possesses different properties and as a result, performs differently with cement depending on many variables. The fineness of the pozzolan, the degree with which a pozzolan is calcined, and the chemical and physical make-up of the pozzolan, are just a few of the variables of the pozzolanic component of a cementitious product which render no two pozzolan cementitious products alike. The resulting performance of each pozzolan in a cementitious product must therefore be analyzed for the effect desired, because there is no sure way to predict how a given pozzolan cement will perform until it is formulated and tested.

Some of the prior pozzolanic cementitious products like Mehta, U.S. Pat. No. 5,346,548 (1994), and, Turpin, Jr., U.S. Pat. No. 4,313,763 (1982), which used slag pozzolans or fly ash pozzolans, suffered from an aesthetically offensive dark color which the pozzolans imparted to the resulting product. Darkly colored cementitious products are unacceptable for many applications where a light colored cementitious product is desired. One example of where light colored cementitious products are highly desired is in swimming pool construction because dark pools create the feeling that the water is dirty. Because no light colored pozzolanic cementitious products are presently available, today's pools are constructed with non-pozzolanic cementitious products foregoing all the benefits that pozzolanic cementitious products have to offer.

Other prior art pozzolan cement products are taught by Jesky, U.S. Pat. No. 3,982,954 (1976), and, Turpin, Jr., U.S. Pat. No. 4,256,500 (1981), both of whom add a single pozzolan component to a cementitious product. Bainton, U.S. Pat. No. 3,953,222 (1976) teaches the acidation of a pozzolan prior to mixing with cement. Other references which teach the combination of cement and a pozzolan to produce materials other than cement are Walter et al., U.S. Pat. No. 5,324,469 (1994); and Turner, U.S. Pat. No. 5,391,245 (1995). None of these teach the use of a plurality of pozzolanic materials to form a superior pozzolanic combination which when admixed with cement, will optimize the desirable properties of the resulting cementitious product. Lower permeability, greater workability, quicker strength recovery, high resistance to chemical and water attack, and lower heat of hydration will be realized. A cementitious product which optimizes all of these desirable properties is still lacking in the art. It is to this end the present invention is directed.

BRIEF SUMMARY OF THE INVENTION

The present invention relates generally to an unique blended cement and/or admixture thereof for making cementitious products. Specifically, the present disclosure describes improved multi-pozzolan admixtures and blended cements which when used as directed will produce cementitious products possessing less permeability, greater durability, higher workability, greater resistance to early attack from chemicals and aggressive water (and the subsequent leaching of calcium hydroxide), and produce significantly less heat of hydration which otherwise can cause uncontrollable setting speeds.

Generally, when the total weight of the blended cement of the present invention contains a Portland cement dry blended with a calcined diatomaceous earth, a calcined kaolin, with or without a potassium salt, a talc, or a bentonite or its equivalent, the blended cement preferably contains from about 55% to about 85% (w/w) of cement, from about 5% to about 20% (w/w) of calcined diatomaceous earth (diatomite), from about 7% to about 20% (w/w) of calcined kaolin, and sufficient potassium salt, such as potassium sulfate, to insure the resulting pozzolanic blended cement contains from about 0.5% to about 4% (w/w) of potassium. The present invention may further contain from about 0% to about 9% (w/w) of talc, and/or from about 0% to about 8% (w/w) of bentonite or its functional equivalent.

Additions of talc and bentonite aid in promoting the workability of the resulting cementitious product made with the present invention. Workability is further enhanced by using a small portion of coarser material. If approximately 5% of the diatomite and approximately 5% of the kaolin are as large as 45 micrometers (μm) (200 mesh), while the remaining 95% of each is 7 μm (325 mesh), workability of the resulting cementitious product is unexpectedly superior than if all ingredients were finer than 7 μm (325 mesh). Fly ash can also be used instead of bentonite to promote workability in certain applications.

The present invention also includes the pre-preparation of any admixtures analogous to the blended cement of the present invention and the subsequent addition of a cement, either dry mix cement or ready mixed cementitious products. An "admixture" is herein defined as any material other than cement, water, sand, and/or aggregate used as an ingredient in a cementitious product before or during job mixing.

When the total weight of the admixture of the present invention contains a calcined diatomite, a calcined kaolin, and/or a potassium salt, a talc or a bentonite or its equivalent, the admixture preferably contains approximately from about 12.5% to about 67% (w/w) of calcined diatomaceous earth and from about 17.5% to about 67% (w/w) of calcined kaolin, and sufficient potassium salt, such as potassium sulfate, to make the resulting blend of admixture and cement contain from about 0.5% to about 4% (w/w) of potassium. The admixture may also contain from about 0% to about 22.5% (w/w) of talc and/or from about 0% to about 20% (w/w) of bentonite or its functional equivalent.

Accordingly, it is a prime object of the present invention to provide an improved and novel composition for making cementitious products which exhibit quicker strength recovery, greater workability, less permeability, more resistance to chemical attack, more resistance to aggressive water (thereby reducing the leaching of calcium hydroxide), and a lower heat of hydration.

A further object of the present invention is to provide a novel cement composition containing Portland cement, calcined diatomite, calcined kaolin, and sufficient potassium salt to make a final cement composition containing from about 0.5% to about 4% (w/w) of potassium.

Still another object of the present invention is to provide a unique admixture (for adding to a dry mix cement or a ready mix cementitious product) containing calcined kaolin, calcined diatomaceous earth and/or talc and/or bentonite, and sufficient potassium to make a cementitious product that has a blend of admixture and cement which contains from about 0.5% to about 4% (w/w) of potassium.

A further object of the present invention is to provide a highly workable blended cement or admixture which contains a calcined diatomite and a calcined kaolin presized so that about 5% of the diatomite and 5% of the kaolin are retained on a 45 μm (200 mesh).

Yet another object of the invention is to provide a unique cement composition that can be used as but not limited to, mortar, stucco, concrete, plaster, pre-cast, gunite, shotcrete, or grout.

These and still further objects as shall hereinafter appear are fulfilled by the present invention in a remarkably unexpected manner as will be readily discerned from a careful consideration of the following detailed description of an exemplary embodiment thereof.

DESCRIPTION OF THE PREFERRED EMBODIMENT

The present invention relates generally to unique blended cements and admixtures for the making of cementitious products. Specifically, the present disclosure describes unique multi-pozzolan blended cement and admixture compositions that possess an increase in strength, workability, resistance to early attack from chemicals and aggressive water, lower heat of hydration and is highly resistant to the leaching of calcium hydroxide.

When the blended cement of the present invention contains only Portland cement, calcined diatomaceous earth and calcined kaolin, the preferred ranges are from about 60% to about 85% (w/w) of Portland cement, from about 13% to about 27% (w/w) of calcined diatomaceous earth, and from about 13% to about 27% (w/w) of calcined kaolin. Where potassium is already present in any of the three ingredients such that the blended cement contains from about 0.5% to about 4% (w/w) of potassium, no additional potassium salt need be added. If insufficient potassium or no potassium is present in the blended cement, a sufficient amount of any effective and compatible potassium salt, such as potassium sulfate, may be added to the blended cement to insure the resulting cementitious that the blended cement contains from about 0.5% to about 4% (w/w) of potassium. The optimum amount of potassium is usually about 2% (w/w) of potassium.

When a blended cement of the present invention also contains talc, the preferred ranges of: from about 60% to about 85% (w/w) of Portland cement; from about 7% to about 27% (w/w) are calcined diatomaceous earth; from about 8% to about 27% (w/w) of calcined kaolin; and from about 4% to about 9% (w/w) of talc. Again, sufficient potassium salt is added if needed to bring the total potassium content of the resulting pozzolanic blended cement to 0.5% to about 4% (w/w).

When a blended cement of the present invention also contains bentonite, the preferred ranges are from about 60% to about 85% (w/w) of Portland cement, from about 8% to about 27% (w/w) of calcined diatomaceous earth, from about 9% to about 27% (w/w) of calcined kaolin, and from about 2% to about 8% (w/w) of bentonite. Again, sufficient potassium salt is added if needed as instructed above.

When a blended cement of the present invention also contains both talc and bentonite, the preferred ranges are from about 60% to about 85% of Portland cement; from about 5% to about 27% (w/w) of calcined diatomaceous earth; from about 7% to about 27% (w/w) of calcined kaolin; from about 4% to about 9% (w/w) of talc; and from about 2.5% to about 8% (w/w) of bentonite. Potassium salt is added if needed as instructed above.

The cement admixtures herein disclosed are analogous to the blended cements of the present invention in that the admixtures contain no cement but do contain the same selection of the other ingredients in relative proportions analogous to those stipulated for the corresponding blended cement. The cement admixture anticipates those situations where the pozzolans are to be subsequently added to cements, a blended cement, or ready mixed wet cementitious product, in order to make the final pozzolanic cementitious product.

When an admixture of the present invention contains calcined diatomaceous earth and calcined kaolin, the preferred ranges are from about 33% to about 67% (w/w) of said calcined diatomaceous earth; and from about 33% to about 67% (w/w) of said calcined kaolin. Where potassium is already present in either of the two ingredients such that the resulting blend of cement and admixture to be created from the admixture contains from about 0.5% to about 4% (w/w) of potassium, no additional potassium salt need be added. If insufficient potassium or no potassium is present in the resulting blend of cement and admixtures a sufficient amount of any effective and compatible potassium salt, such as potassium sulfate, may be added to the blended cement to insure the resulting cementitious product contains from about 0.5% to about 4% (w/w) of potassium. The optimum amount of potassium is usually about 2% (w/w) of potassium.

When an admixture of the present invention also contains talc, the preferred ranges of the several ingredients are from about 17.5% to about 67% (w/w) of calcined diatomaceous earth, from about 20% to about 67% (w/w) of calcined kaolin, and from about 10% to about 22.5% (w/w) of talc. Potassium salt is added as needed as instructed above.

When an admixture of the present invention also contains bentonite, the preferred ranges are from about 20% to about 67% (w/w) of calcined diatomaceous earth, from about 22.5% to about 67% (w/w) of calcined kaolin, and from about 6.0% to about 20% (w/w) of bentonite. Again, potassium salt is added as needed as instructed above.

When the admixture of the present invention also contains both talc and bentonite, the preferred ranges for the several ingredients are from about 12.5% to about 67% (w/w) of calcined diatomaceous earth, from about 17.5% to about 67% (w/w) of calcined kaolin, from about 10% to about 22.5% (w/w) of talc, and from about 6% to about 20% (w/w) of bentonite. Sufficient potassium salt is added if needed and as instructed above.

The cementitious products produced from the blends and admixtures of the present invention are superior to the existing pozzolan cementitious products in that the cementitious products produced from the present invention are more workable, and react faster with calcium hydroxide resulting in a more rapid decrease in permeability, a more rapid rate of resistance to water or chemical attack and a more rapid increase in compression strength recovery.

The pozzolan blended cement compositions of the present invention satisfy the standards of American Society for Testing and Materials (ASTM) C595.

Preferably, the cement constituent of the present invention is any Portland cement meeting the ASTM classification of C150 (Types I–VIII). ASTM C150—*Standard Specification for Portland Cement*. This standard covers eight types of Portland cement, each possessing different properties and used specifically for those properties.

The talc ingredient (hydrous magnesium silicate) of the present invention is a fine powder of inert ingredients which will increase the paste or "creme layer" of cement products. The preferred talc has a fineness of a range equal to that of passing a 200 mesh–325 mesh or finer. Talc lends greater workability, or body, to the resulting cement.

The bentonite ingredient (magnesium aluminum silicate) of the present invention is preferably a calcium bentonite, low swelling, colloidal type. The preferred bentonite has a fineness of 200 mesh or finer. The bentonite lends greater workability, ease of application, and increased pozzolanic activity to the resulting cement. Other functionally equivalent ingredients, like fly ash, can be substituted for bentonite when desired.

The potassium in the cementitious products of the present invention is, as a practicality, rarely added directly as a potassium salt, such as potassium sulfate or compound, although it is possible to do so. Typically, potassium is present in the other ingredients of the cement mixture. For example, potassium has been found to be inherently present in cement, diatomaceous earth, kaolin, and talc. Bentonite, or its functional equivalent, may also be used as a source of potassium to make the blended cement/admixture/cementitious product of the present invention. When potassium presence is found to be sufficient, then additional potassium is not required. The decision as to what form of potassium is utilized in the cementitious product of the present invention is determined by availability of ingredients, cost, and so forth. Regardless of the means by which the potassium is introduced, the composition of the present invention should contain potassium in an amount approximately 0.5%–4% (w/w). Potassium is believed to act as a quasi-catalyst in cement/admixture reaction between all the pozzolanic ingredients of the present invention and the calcium hydroxide in the cement and is a vital part of the present invention. Thus, potassium facilitates the pozzolanic activity by increasing the reactivity of the pozzolans with the calcium hydroxide in cement.

Preferably, the calcined diatomaceous earth pozzolan ingredient of the present invention is an amorphous calcined powder with a siliceous content of 80% or greater, and is ground to a fineness of 325 mesh with no more than 5% retaining. The diatomaceous pozzolan combines rapidly with the calcium hydroxide in cement rendering the calcium hydroxide no longer susceptible to attacks of chemicals or aggressive water.

Preferably, the calcined kaolin pozzolan ingredient (anhydrous aluminum silicate) is 97% pure (no impurities exceeding 3%) and ground to a fineness of 325 mesh with no more than 5% retaining. Kaolin is a clay with good pozzolanic properties. When calcined, an amorphous product results. The kaolin pozzolan ingredient reacts with the calcium hydroxide in cement lending strength to that of normal hydrate products in cement.

In a preferred practice of the present invention, the pozzolans hereof will meet the specifications of ASTM C618. ASTM C618—*Standard Specification for Fly Ash and Raw Mineral or Calcined Natural Pozzolan for Use as a Mineral Admixture in Portland Cement*. Class N is the standard that covers specific chemical and physical properties of clays, shales, diatomaceous earths, opaline cherts, tuffs and volcanic pozzolans. Class F comprises fly ash with no cementing value of its own. Class C comprises fly ash with some cementing properties of its own.

Other additives such as air entrainment additives, plasticizers, and super plasticizers may also be added to the compositions of the present invention when desired to further enhance specific properties of the resulting cementitious product in accordance with the known art. The amount of additive added depends on the particular additive used, the nature of the other ingredients in the mix, and the specific use to which the resulting cementitious product will be put.

To make either the blended cement or admixture of the present invention the diatomaceous earth and kaolin are preferably calcined by firing to 1000° C. for about 30 minutes. The calcined diatomaceous earth and the calcined kaolin are ground to at least a fineness of 325 mesh (7 μm)

with up to 5% larger than 325 mesh retaining. The bentonite and talc are ground to a fineness of 200–325 mesh or finer. The dry ingredients are then combined and blended together until well-blended according to known industrial procedures.

To use the blended cement of the present invention to make a cementitious product involves the addition of water, sand and/or aggregate. The use of the admixture of the present invention, would of course also include the addition of cement as well. Any conventional procedure for making cementitious products of the present invention in the art may be utilized such as those described by *Concrete Construction Handbook,* Second Edition, Waddell, J. J., Editor-in-Chief, 1974, and incorporated herein.

To further aid in the understanding of the present invention and not by way of limitation, the following examples are presented. The ingredients of the several examples were prepared as described above.

EXAMPLE 1

Two samples were made and molded into 2"×2" cubes for compression tests conducted according to ASTM Standard C100. Underwater immersion was used for the method of cure.

Sample 1 was a non-pozzolan cementitious product and was prepared by combining white Portland Cement Type I, limestone sand in a 1:2 ratio of cement to sand, and a 0.4:1 ratio of water to cement. All ingredients were combined and thoroughly mixed until well blended.

Sample 2 was a pozzolan cementitious product of the present invention and was prepared by combining 69% (w/w) of white Portland Cement Type I, 7% (w/w) of talc, 8% (w/w) of calcined diatomaceous earth, 11% (w/w) of calcined kaolin, and 5% (w/w) of bentonite containing potassium.

This blended cement was then mixed according to conventional procedures with a 1:2 mix ratio of cement:sand with a 1:0.5 blended cement to water ratio to prepare the cementitious product of Sample 2. The blended cement of Sample 2 contained 2% (w/w) of potassium. The results of the test are reported below in Table 1:

TABLE 1

| Lapsed Time | Compression Strength (p.s.i) | |
|---|---|---|
| | Sample 1* | Sample 2** |
| 3 days | 3345 | 2180 |
| 7 days | 4725 | 3610 |
| 28 days | 6550 | 5200 |

\* = Non-pozzolanic blended cement
\*\* = Pozzolanic blended product of present invention

EXAMPLE II

Two samples were made and molded into 8"×4" cylinders for compression tests conducted pursuant to ASTM Standards C109. Underwater immersion was used for the method of cure.

Sample 1 was a non-pozzolan cementitious product and was prepared by combining a 1:2:4 mix ratio of cement:sand:gravel with a 1:0.5 blended cement to water ratio. All ingredients were mixed until well blended.

Sample 2 was a pozzolan cementitious product of the present invention and was prepared by combining 69% (w/w) of white Portland Cement Type I, 7% (w/w) of talc, 8% (w/w) of diatomaceous earth, 11% (w/w) of kaolin, and 5% (w/w) of bentonite with potassium present at an amount sufficient to provide the resulting blend with 2% (w/w).

The blended cement was then mixed according to conventional procedures with a 1:2:4 mix ratio of cement:sand:gravel with a 1:0.6 blended cement to water ratio to prepare the cementitious product of Sample 2. The blended cement of Sample 2 contained 2% (w/w) of potassium. The results of the test are reported below in Table 2:

TABLE 2

| Lapsed Time | Compression Strength (p.s.i) | |
|---|---|---|
| | Sample 1* | Sample 2** |
| 3 days | 1200 | 910 |
| 7 days | 3315 | 2245 |
| 28 days | 4400 | 3620 |

\* = Non-pozzolanic blended cement
\*\* = Pozzolanic blended product of present invention Tables 1 and 2 show a significant recovery of compression strength in the pozzolanic blended cementitious product. The pozzolanic cementitious products of Examples I and II can be expected to exhibit a compression strength substantially equal to that of the non-pozzolanic concrete after about one year.

EXAMPLE 3

A blended cement is prepared by mixing together until well blended to provide a composition containing approximately 69% (w/w) of Portland cement, 16% (w/w) of calcined kaolin, 13% (w/w) of calcined diatomaceous earth, and 2% (w/w) of potassium.

A shotcrete product is prepared by blending the blended cement prepared above with water, sand, and gravel in a 1:2:4 mix ratio of cement:sand:gravel and sufficient water until a shotcrete having the desired workable consistency is prepared.

EXAMPLE 4

A blended cement of the present invention is prepared by mixing together until well blended to provide a composition containing approximately 70% (w/w) of cement, 13% (w/w) of calcined kaolin, 10% (w/w) of calcined diatomaceous earth, and 7% (w/w) of bentonite containing potassium, to create a mixture containing approximately 2% (w/w) of potassium.

A concrete product is prepared by blending the blended cement prepared above with water, sand, and aggregate in a 1:2:4 mix ratio of cement:sand:aggregate and sufficient water until a workable concrete is prepared.

EXAMPLE 5

An admixture is prepared by mixing together approximately 42% (w/w) of calcined kaolin, 32% (w/w) of calcined diatomaceous earth, and 22% (w/w) of talc and 3% (w/w) of potassium sulfate.

A pozzolan cementitious product is prepared by blending the admixture prepared above with a ready mixed cementitious product having a 1:2:4 mix ratio of cement:sand:gravel. 31% (w/w) of pozzolan admixture is added to 69%

(w/w) of cement. Sufficient water is added until the desired workable consistency is achieved.

EXAMPLE 6

A blended cement of the present invention is prepared by mixing together approximately 69% (w/w) of cement, 11% (w/w) of calcined kaolin, 8% (w/w) of calcined diatomaceous earth, 7% (w/w) of talc, and 5% (w/w) bentonite that contains potassium, to create a blended cement having 2% (w/w) of potassium.

A plaster is prepared by thoroughly blending the cement mixture above in a 1:2 mix ratio of cement:sand and sufficient water until a plaster with the desired workable consistency is achieved.

From the foregoing, it is readily apparent that a useful embodiment of the present invention has been herein described and illustrated which fulfills all of the aforestated objects in a remarkably unexpected fashion. It is of course understood that such modifications, alterations and adaptations as may readily occur to the artisan confronted with this disclosure are intended within the spirit of this disclosure which is limited only by the scope of the claims appended hereto.

What is claimed is:

1. An admixture for subsequent addition to cement to create a blended cement, said blended cement having from about 15% to about 40% (w/w) of said admixture blended therein, said admixture comprising: from about 12.5% to about 67% (w/w) of calcined diatomaceous earth; from about 17.5% to about 67% (w/w) of calcined kaolin; from about 0% to about 22.5% (w/w) of talc; from about 0% to about 20% (w/w) of bentonite; and sufficient potassium to provide the blended cement with about 0.5% to about 4% (w/w) potassium.

2. An admixture matter according to claim 1 wherein said calcined diatomaceous earth and said calcined kaolin are ground to a fineness of at least 325 mesh with a maximum of about 5% retaining; and said bentonite and said talc are ground to a fineness of at least 200 mesh.

3. An admixture according to claim 1 containing from about 33% to about 67% (w/w) of said calcined diatomaceous earth; and from about 33% to about 67% (w/w) of said calcined kaolin.

4. An admixture according to claim 1 containing from about 17.5% to about 67% (w/w) of said calcined diatomaceous earth; from about 20% to about 67% (w/w) of said calcined kaolin; and from about 10% to about 22.5% (w/w) of said talc.

5. An admixture according to claim 1 containing from about 20% to about 67% (w/w) of said calcined diatomaceous earth; from about 22.5% to about 67% (w/w) of said calcined kaolin; and from about 6% to about 20% (w/w) of said bentonite.

6. An admixture according to claim 1 containing from about 12.5% to about 67% (w/w) of said calcined diatomaceous earth; from about 17.5% to about 67% (w/w) of said calcined kaolin; from about 10% to about 22.5% (w/w) of said talc; and from about 6% to about 20% (w/w) said bentonite.

7. A composition of matter comprising water, sand and/or aggregate and, a blended cement containing cement and from about 15 % to about 40% (w/w) of the admixture of claim 1.

8. A composition comprising the admixture of claim 1, adapted for use in general construction.

9. A composition comprising the admixture of claim 1, adapted for use in the construction of structures to be exposed to water.

10. A composition comprising the admixture of claim 1, adapted for the construction of pre-cast members.

11. A composition comprising the admixture of claim 1, adapted for the construction of pre-fabricated units for the construction of buildings.

12. A composition of matter comprising water and a quantity of dry materials including from about 60% to about 85% (w/w) of cement; from about 5% to about 27% (w/w) of calcined diatomaceous earth; from about 7% to about 27% (w/w) of calcined kaolin; from about 0% to about 9% (w/w) of talc; from about 0% to about 8% of bentonite; and from about 0.5% to about 4% (w/w) of potassium, said weight percentages (w/w) being taken relative to the total weight of said quantity of dry materials.

13. A composition of matter according to claim 7 containing from about 4% to about 9% (w/w) of said talc; and from about 2.5% to about 8% (w/w) of said bentonite.

14. A composition of matter according to claim 12 containing from about 60% to about 85% (w/w) of said Portland cement; from about 8% to about 27% (w/w) of said calcined diatomaceous earth; from about 9% to about 27% (w/w) of said calcined kaolin; and from about 2.5% to about 8% (w/w) of said bentonite.

15. A composition of matter according to claim 12 containing from about 60% to about 85% (w/w) of said Portland cement; from about 7% to about 27% (w/w) of said calcined diatomaceous earth; from about 8% to about 27% (w/w) of said calcined kaolin; and from about 4% to about 9% (w/w) of said talc.

16. A composition of matter according to claim 12 containing from about 60% to about 85% (w/w) of said Portland cement; from about 13% to about 27% (w/w) of said calcined diatomaceous earth; and from about 13% to about 27% (w/w) of said calcined kaolin.

17. A composition of matter according to claim 12, wherein said calcined diatomaceous earth and said calcined kaolin are ground to a fineness of at least 325 mesh with a maximum of about 5% retaining; and said bentonite and said talc are ground to a fineness of at least 200 mesh.

18. A composition of matter comprising sand and/or aggregate and, the composition of claim 12.

19. A composition of matter according to claim 18 in which said dry materials are mixed with water and sand and/or aggregate during job mixing.

20. A composition comprising the composition of claim 12, adapted for use in general construction.

21. A composition comprising the composition of claim 12, adapted for use in the construction of structures to be exposed to water.

22. A composition comprising the composition of claim 12, adapted for the construction of pre-cast members.

23. A composition comprising the composition of claim 12, adapted for the construction of pre-fabricated units for the construction of buildings.

24. A composition of matter according to claim 12 in which said water is mixed with said dry materials during job mixing.

25. A pozzolanic cement comprising from about 60% to about 85% (w/w) of cement thoroughly blended with an admixture having from about 12.5% to about 67% (w/w) of calcined diatomaceous earth; from about 17.5% to about 67% (w/w) of calcined kaolin; from about 0% to about 22.5% (w/w) of talc; from about 0% to about 20% (w/w) of bentonite; and sufficient potassium to provide the resulting pozzolanic cement with about 0.5% to about 4% (w/w) potassium.

26. A composition of matter comprising water, sand and/or aggregate and, the composition of claim 25.

27. A composition comprising the pozzolanic cement of claim 25, adapted for use in general construction.

28. A composition comprising the pozzolanic cement of claim 25, adapted for use in the construction of structures to be exposed to water.

29. A composition comprising the pozzolanic cement of claim 25, adapted for the construction of pre-cast members.

30. A composition comprising the pozzolanic cement of claim 25, adapted for the construction of pre-fabricated units for the construction of buildings.

* * * * *